(12) United States Patent
Zigdon

(10) Patent No.: US 9,799,068 B2
(45) Date of Patent: Oct. 24, 2017

(54) MEASUREMENT OF A BODY PART

(71) Applicant: MY SIZE ISRAEL 2014 LTD., Airport City (IL)

(72) Inventor: Shoshana Zigdon, Givataim (IL)

(73) Assignee: MY SIZE ISRAEL 2014 LTD., Airport City (IL)

( * ) Notice: Subject to any disclaimer, the term of this patent is extended or adjusted under 35 U.S.C. 154(b) by 513 days.

(21) Appl. No.: 14/373,058

(22) PCT Filed: Jan. 20, 2013

(86) PCT No.: PCT/IL2013/050056
§ 371 (c)(1),
(2) Date: Jul. 18, 2014

(87) PCT Pub. No.: WO2013/108260
PCT Pub. Date: Jul. 25, 2013

(65) Prior Publication Data
US 2014/0372247 A1   Dec. 18, 2014

Related U.S. Application Data
(60) Provisional application No. 61/588,335, filed on Jan. 19, 2012.

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0621* (2013.01); *G06Q 30/0639* (2013.01)

(58) Field of Classification Search
CPC ......................................... G06C 30/06–30/08
(Continued)

(56) References Cited

U.S. PATENT DOCUMENTS 7,398,133 B2 * 7/2008 Wannier ............. G06Q 30/0601
                                                        700/130
2007/0198120 A1   8/2007 Wannier et al.
(Continued)

FOREIGN PATENT DOCUMENTS

JP   2001-212111   8/2001
RU      2433487   11/2011
(Continued)

OTHER PUBLICATIONS

D'Apuzzo, Nicola, Human Body Measurement Newsletter, vol. 4, No. 1, Aug. 2009, pp. 1-7 (URL: http://www.hometrica.ch/docs/newsletter0901.pdf).*
D'Apuzzo, Nicola. Human Body Measurement Newsletter. vol. 4, No. 1, Aug. 2009, p. 1-7.
New 'virtual' tape measure could give online clothes shoppers the perfect fit. Engineering and Physical Sciences Research Council. Nov. 28, 2012. <www.epsrc.ac.uk/newsevents/news/2012/Pages/virtualtapemeasure.aspx>.
(Continued)

*Primary Examiner* — Ethan D Civan
(74) *Attorney, Agent, or Firm* — Wiggin and Dana LLP; Gregory S. Rosenblatt; Andrew D. Bochner

(57) ABSTRACT

A method of obtaining a user's measurement for matching an item, comprising obtaining a predefined definition of a first body part; displaying on a user's handheld device instructions for measuring, using the handheld device, the first body part according to the predefined definition; utilizing a sensor of the handheld device that is adapted to measure physical displacement of the handheld device to measure a total physical displacement of the handheld device's movement over the first body part, giving rise to a first measurement; and searching for an item having a specification that matches the first measurement.

20 Claims, 4 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 2008/0147231 A1* | 6/2008 | Fernandez | A41H 3/007 700/138 |
| 2010/0074609 A1 | 3/2010 | Kasama et al. | |
| 2010/0111370 A1* | 5/2010 | Black | G06K 9/00369 382/111 |
| 2011/0093361 A1 | 4/2011 | Morales | |

FOREIGN PATENT DOCUMENTS

| | | | | |
|---|---|---|---|---|
| WO | WO 0025674 | | 5/2000 | |
| WO | 2011143113 | | 11/2011 | |
| WO | WO 2011143113 A1 * | | 11/2011 | ......... G06Q 30/0603 |
| WO | 2012066555 | | 5/2012 | |
| WO | WO 2014203433 | | 12/2014 | |

OTHER PUBLICATIONS

Pott, Kyle. Find clothes that fit and flatter your body. Lifehack.org. Mar. 16, 2007. <www.lifehack.org/articles/lifestyle/find-clothes-that-fit-and-flatter-your-body.html>.

Tedeschi, Bob. Log in Your Measurements, and the Clothes May Fit. The New York Times. Mar. 12, 2007. <www.nytimes.com/2007/03/12/technology/12ecom.html?pagewanted=all&_r=1>.

R&D Magazine. Battelle licenses body measurement technology for apparel applications. Advantage Business Media. Jun. 28, 2011. <www.rdmag.com/news/2011/06/battelle-licenses-body-measurement-technology-apparel-applications>.

Wickham, Chris. New body scanner offers virtual tape measure for online shopping. Thomson Reuters. Nov. 21, 2012. (http://uk.reuters.com/article/uk-science-bodyscan-shopping-idUKBRE8AK00520121>.

Applications of the SYMCAD technology. Telmat Industrie SA. Aug. 14, 2009. <www.symcad.com/eng/applications.htm>.

Rospatent, Decision on Grant, Application No. RU 2014133896/08(054737), 10 pages, mailed Jun. 15, 2017.

* cited by examiner

MEASUREMENT OF A BODY PART

CROSS REFERENCE TO RELATED APPLICATIONS

This application is a U.S. national-phase application pursuant to 35 U.S.C. §371, claiming benefit of international PCT Application No. PCT/IL2013/050056, titled "MEASUREMENT OF A BODY PART" that was filed Jan. 20, 2013, which claims the benefit of U.S. Provisional Patent Application No. 61/558,335, that was filed Jan. 19, 2012. The disclosures of PCT/IL2013/050056 and 61/558,335 are incorporated by reference herein in their entirety.

TECHNICAL FIELD

The present disclosure relates to examples of a method and device for measuring a body part.

BACKGROUND

A software system is being developed by London College of Fashion and computer vision experts at the University of Surrey, in collaboration with body-mapping specialists Bodymetrics and digital creative agency Guided to enable users obtain measurements of the body based on a photograph of the user's body and the user's height. The height measurement gives the software the starting point for ascertaining the body size of the shopper. The software takes measurements at a number of different points on the body and combines these with the user's overall proportions to build up a detailed 3D image.

International Application Publication No. WO2012/066555 discloses a computer program for obtaining anthropometric measurements of a person, implementing a method including providing instructions to a person to set up conditions for producing a suitable image, receiving the image from a camera, the image including at least part of the person's body, analyzing the image, providing at least one measurement based, at least in part, on the analyzing. Related apparatus and methods are also described.

SUMMARY

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on tangible computer readable medium. The operational data can be a single data set, or it can be an aggregation of data stored at different locations, on different network nodes or on different storage devices.

According to an aspect of the presently disclosed subject matter, there is provided a method and an apparatus for obtaining a user's measurement for matching an item. In accordance with an aspect of the presently disclosed subject matter, there is provided a method of obtaining a user's measurement for matching an item, comprising: obtaining a predefined definition of a first body part; displaying on a user's handheld device instructions for measuring, using the handheld device, the first body part according to the predefined definition; utilizing a sensor of the handheld device that is adapted to measure physical displacement of the handheld device to measure a total physical displacement of the handheld device's movement over the first body part, giving rise to a first measurement; and searching for an item having a specification that matches the first measurement.

In accordance with an embodiment of the presently disclosed subject matter, there is further provided a method, comprising: obtaining a predefined definition of a second body part; repeating the displaying and utilizing for the second body part, giving rise to a second measurement, and wherein the searching includes searching for an item having a specification that matches the first and the second measurements.

In accordance with an embodiment of the presently disclosed subject matter, there is yet further provided a method, further comprising obtaining personal data of the user, and wherein the searching comprises searching for an item having a specification that matches the first measurement and the user's personal data.

In accordance with an embodiment of the presently disclosed subject matter, there is yet further provided a method, wherein the personal data of the user includes one or more of the following: waist diameter, arm length, leg length, chest diameter, hip diameter, regular inseam, long inseam, short inseam, neck diameter.

In accordance with an embodiment of the presently disclosed subject matter, there is yet further provided a method, wherein the sensor is selected from a group consisting of: a gyroscope, an accelerometer, proximity sensor, compass, GPS sensor.

In accordance with an embodiment of the presently disclosed subject matter, there is yet further provided a method, further comprising: validating the first measurement using statistical data that is associated with the first body part.

In accordance with an embodiment of the presently disclosed subject matter, there is yet further provided a method, wherein the searching comprises communicating the first measurement and an indication regarding the body part to which it relates to one or more subscribers, and in response to the communicating receiving data in respect of an item having a specification that matches the first measurement.

In accordance with an embodiment of the presently disclosed subject matter, there is yet further provided a method, wherein in response to the searching, selecting a group of items which matches the first measurement, and allowing the user to select an item from the group of items.

In accordance with an embodiment of the presently disclosed subject matter, there is yet further provided a method, wherein in response to the searching, providing a code of an item that matches the first measurement.

In accordance with an embodiment of the presently disclosed subject matter, there is yet further provided a method, wherein in response to the searching, providing data in respect of an item that matches the first measurement including one or more locations where the matching item can be obtained.

In accordance with an embodiment of the presently disclosed subject matter, there is yet further provided a method, further comprising utilizing a positioning sensor in the handheld device, to direct the user to the one or more locations where the item that matches the first measurement can be obtained.

In accordance with an aspect of the presently disclosed subject matter, there is yet further provided a handheld device, comprising: a display; a sensor adapted to measure physical displacement of the handheld device; a body part definition repository including a predefined definition of at least a first body part; a measurement repository that is adapted to store a measurement of at least the first body part; a body part measurement engine that is adapted to implement a body measurement routine including: displaying on the display instructions for measuring the first body part according to a respective definition of the first body part; measuring, using the sensor, a total physical displacement of the handheld device over first the body part, giving rise to a first measurement; and an item search engine adapted to search for an item having a specification that matches the first measurement.

In accordance with an aspect of the presently disclosed subject matter, there is yet further provided a system for obtaining a user's measurement for matching an item, comprising: a handheld device comprising: a display; and a sensor that is adapted to measure physical displacement of the handheld device; a body part definition repository including a predefined definition of at least a first body part; a measurement repository that is adapted to store a measurement of at least the first body part; a body part measurement engine that is adapted to implement a body measurement routine including: causing the display to display instructions for measuring, using the sensor, the first body part according to a respective definition of the first body part; utilizing the sensor to measure a total physical displacement of the handheld device over first the body part, giving rise to a first measurement; and an item search engine adapted to search for an item having a specification that matches the first measurement.

In accordance with an aspect of the presently disclosed subject matter, there is yet further provided a method of obtaining measurements of a user, comprising: utilizing a sensor of the handheld device that is adapted to measure physical displacement of the handheld device to measure a total physical displacement of the handheld device's movement over a first body part, giving rise to a first measurement; obtaining a second measurement of a second body part; obtaining a set of predefined sizes of an item, each one of the sizes is associated with a different size of at least the first body part; adjusting the first measurement using the second measurement; selecting one of the predefined sizes of the item at least according to the adjusted first measurement.

In accordance with an embodiment of the presently disclosed subject matter, there is yet further provided a method, wherein the first measurement prior to adjustment is associated with a first predefined size of the item, and the adjusted first measurements is associated with a second predefined size of the item.

In accordance with an embodiment of the presently disclosed subject matter, there is yet further provided a method, further comprising calculating, based on the first measurement, an estimate for the size of the second body part, and wherein the adjusting is based on a relation between the estimate for the size of the second body part and the second measurement.

In accordance with an embodiment of the presently disclosed subject matter, there is yet further provided a method, wherein the second measurement is comprised of a plurality of measurements.

In accordance with an embodiment of the presently disclosed subject matter, there is yet further provided a method, further comprising: calculating based on the first measurement a first estimate for the size of a second body part; computing a certainty parameter based on a relation between the first estimate and the second measurement; and if the certainty parameter fails to meet a certainty criterion, calculating based on the first and/or second measurements a second estimate for the size of a third body part; and obtaining a third measurement of a third body part.

In accordance with an embodiment of the presently disclosed subject matter, there is yet further provided a method, wherein when the certainty parameter meets the certainty criterion adjusting at least the first measurement at least based on one other measurement, and selecting one of the predefined sizes of the item at least according to the adjusted first measurement.

In accordance with an embodiment of the presently disclosed subject matter, there is yet further provided a method, wherein the second measurement is obtained by utilizing the sensor of the handheld device to measure a total physical displacement by the handheld device's movement over the second body part, giving rise to a second measurement.

In accordance with an embodiment of the presently disclosed subject matter, there is yet further provided a method, wherein the second measurement is provided as an input to the handheld device.

In accordance with an aspect of the presently disclosed subject matter, there is yet further provided a handheld device, comprising: a sensor adapted to measure a physical displacement of the handheld device; a body part measurement engine that is adapted to utilize the sensor to measure a total physical displacement by the handheld device's movement over first the body part, giving rise to a first measurement; and a measurement repository that is adapted to store a measurement of at least a second body part; a processor configured to adjust the first measurement using the second measurement, and to select according to the adjusted first measurement an item's matching size from a set of predefined item's sizes, wherein each one of the item's sizes is associated with a different size of at least the first body part.

In accordance with an aspect of the presently disclosed subject matter, there is yet further provided a system for obtaining measurements of a user, comprising: a handheld device comprising a sensor adapted to measure a physical displacement of the handheld device; a body part measurement engine that is adapted to utilize the sensor to measure a total physical displacement by the handheld device's movement over a first body part, giving rise to a first measurement; and a measurement repository that is adapted to store a measurement of a second body part; a processor configured to adjust the first measurement using the second measurement, and to select according to the adjusted first measurement an item's matching size from a set of predefined item's sizes, wherein each one of the item's sizes is associated with a different size of at least the first body part.

In accordance with an aspect of the presently disclosed subject matter, there is yet further provided a method of obtaining measurements of a user, comprising: utilizing a sensor of the handheld device that is adapted to measure physical displacement of the handheld device to measure a total physical displacement of the handheld device's movement over a first body part, giving rise to a first measurement; obtaining a second measurement of a second body part; obtaining a set of predefined sizes of an item, each one of the sizes is associated with a different size of at least the second body part; adjusting the second measurement using the first measurement; selecting one of the predefined sizes of the item at least according to the adjusted second measurement.

In accordance with an aspect of the presently disclosed subject matter, there is yet further provided a handheld device, comprising: a sensor adapted to measure a physical displacement of the handheld device; a body part measurement engine that is adapted to utilize the sensor to measure a total physical displacement by the handheld device's movement over first the body part, giving rise to a first measurement; and a measurement repository that is adapted to store a measurement of at least a second body part; a processor configured to adjust the second measurement using the first measurement, and to select according to the adjusted second measurement an item's matching size from a set of predefined item's sizes, wherein each one of the item's sizes is associated with a different size of at least the second body part.

In accordance with an aspect of the presently disclosed subject matter, there is yet further provided a system for obtaining measurements of a user, comprising: a handheld device comprising a sensor adapted to measure a physical displacement of the handheld device; a body part measurement engine that is adapted to utilize the sensor to measure a total physical displacement by the handheld device's movement over a first body part, giving rise to a first measurement; and a measurement repository that is adapted to store a measurement of a second body part; a processor configured to adjust the second measurement using the first measurement, and to select according to the adjusted second measurement an item's matching size from a set of predefined item's sizes, wherein each one of the item's sizes is associated with a different size of at least the second body part.

In accordance with an aspect of the presently disclosed subject matter, there is yet further provided a program storage device readable by machine, tangibly embodying a program of instructions executable by the machine to perform a method of obtaining a user's measurement for matching an item, comprising: obtaining a predefined definition of a first body part; displaying on a user's handheld device instructions for measuring, using the handheld device, the first body part according to the predefined definition; utilizing a sensor of the handheld device that is adapted to measure physical displacement of the handheld device to measure a total physical displacement of the handheld device's movement over the first body part, giving rise to a first measurement; and searching for an item having a specification that matches the first measurement.

In accordance with an aspect of the presently disclosed subject matter, there is yet further provided a computer program product comprising a computer useable medium having computer readable program code embodied therein for obtaining a user's measurement for matching an item, the computer program product comprising: computer readable program code for causing the computer to obtain a predefined definition of a first body part; computer readable program code for causing the computer to display on a user's handheld device instructions for measuring, using the handheld device, the first body part according to the predefined definition; computer readable program code for causing the computer to utilize a sensor of the handheld device that is adapted to measure physical displacement of the handheld device to measure a total physical displacement of the handheld device's movement over the first body part, giving rise to a first measurement; and computer readable program code for causing the computer to search for an item having a specification that matches the first measurement.

In accordance with an aspect of the presently disclosed subject matter, there is yet further provided a program storage device readable by machine, tangibly embodying a program of instructions executable by the machine to perform a method of obtaining measurements of a user, comprising: utilizing a sensor of the handheld device that is adapted to measure physical displacement of the handheld device to measure a total physical displacement of the handheld device's movement over a first body part, giving rise to a first measurement; obtaining a second measurement of a second body part; obtaining a set of predefined sizes of an item, each one of the sizes is associated with a different size of at least the first body part; adjusting the first measurement using the second measurement; selecting one of the predefined sizes of the item at least according to the adjusted first measurement.

In accordance with an aspect of the presently disclosed subject matter, there is yet further provided a computer program product comprising a computer useable medium having computer readable program code embodied therein for obtaining measurements of a user, the computer program product comprising: computer readable program code for causing the computer to utilize a sensor of the handheld device that is adapted to measure physical displacement of the handheld device to measure a total physical displacement of the handheld device's movement over a first body part, giving rise to a first measurement; computer readable program code for causing the computer to obtain a second-measurement of a second body part; computer readable program code for causing the computer to obtain a set of predefined sizes of an item, each one of the sizes is associated with a different size of at least the first body part; computer readable program code for causing the computer to adjust the first measurement using the second measurement; computer readable program code for causing the computer to select one of the predefined sizes of the item at least according to the adjusted first measurement.

In accordance with an aspect of the presently disclosed subject matter, there is yet further provided a program storage device readable by machine, tangibly embodying a program of instructions executable by the machine to perform a method of obtaining measurements of a user, comprising: utilizing a sensor of the handheld device that is adapted to measure physical displacement of the handheld device to measure a total physical displacement of the handheld device's movement over a first body part, giving rise to a first measurement; obtaining a second measurement of a second body part; obtaining a set of predefined sizes of an item, each one of the sizes is associated with a different size of at least the second body part; adjusting the second measurement using the first measurement; selecting one of the predefined sizes of the item at least according to the adjusted second measurement.

In accordance with an aspect of the presently disclosed subject matter, there is yet further provided a computer program product comprising a computer useable medium having computer readable program code embodied therein for obtaining measurements of a user, the computer program product comprising: computer readable program code for causing the computer to utilize a sensor of the handheld device that is adapted to measure physical displacement of the handheld device to measure a total physical displacement of the handheld device's movement over a first body part, giving rise to a first measurement; computer readable program code for causing the computer to obtain a second measurement of a second body part; computer readable program code for causing the computer to obtain a set of predefined sizes of an item, each one of the sizes is associated with a different size of at least the second body part; computer readable program code for causing the computer to adjust the second measurement using the first measurement; computer readable program code for causing the computer to select one of the predefined sizes of the item at least according to the adjusted second measurement.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
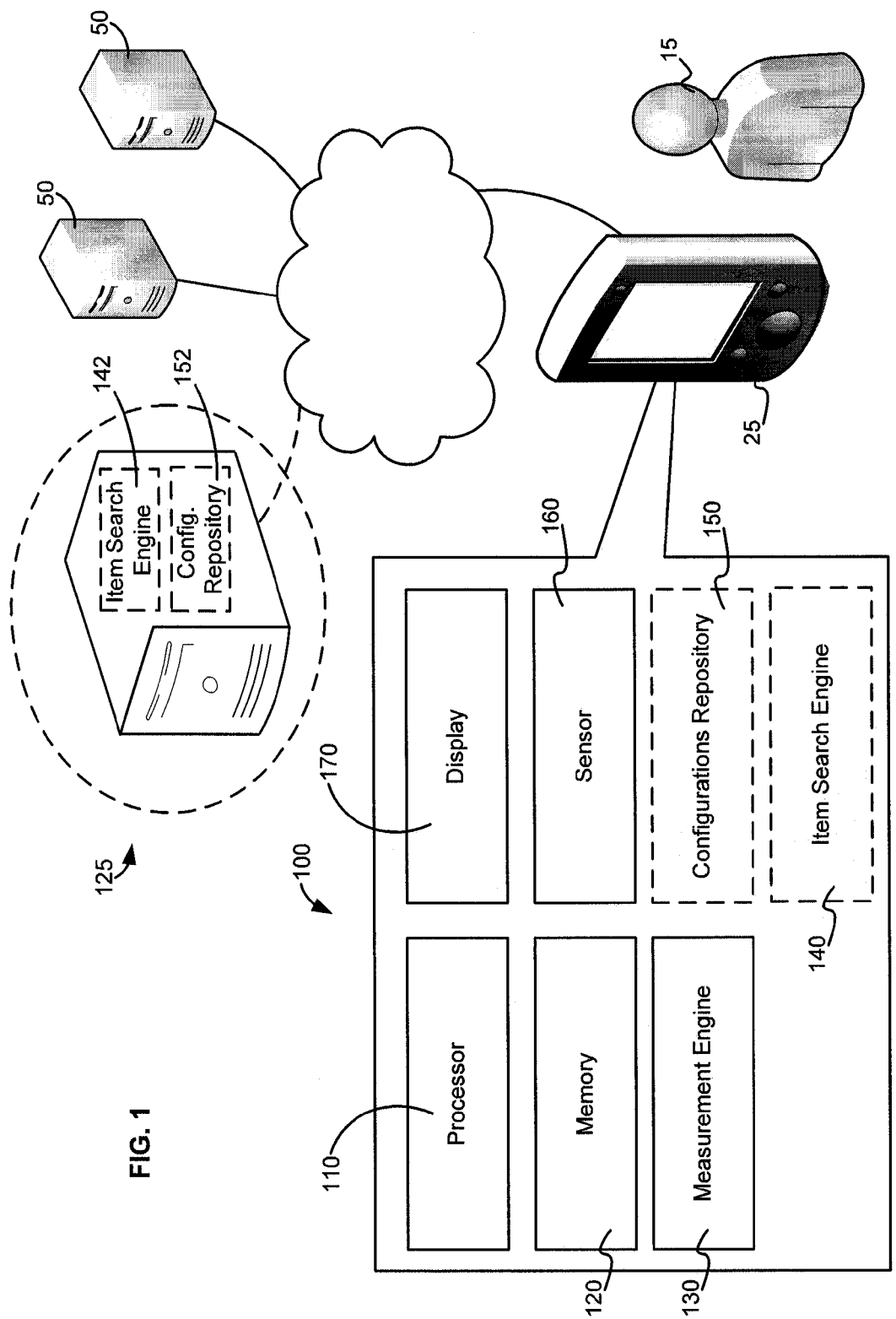
FIG. 1 is a block diagram illustration of an apparatus for obtaining a measurement of a body part and a matching item, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

As used herein, the terms "example", "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

The references cited in the background teach many principles of measuring a body part that are applicable to the presently disclosed subject matter. Therefore the full contents of these publications are incorporated by reference herein where appropriate for appropriate teachings of additional or alternative details, features and/or technical background.

The operations in accordance with the teachings herein may be performed by a computer specially constructed for the desired purposes or by a general purpose computer specially configured for the desired purpose by a computer program stored in a non-transitory computer readable storage medium.

Embodiments of the presently disclosed subject matter are not described with reference to any particular programming language. It will be appreciated that a variety of programming languages may be used to implement the teachings of the presently disclosed subject matter as described herein.

Unless specifically stated otherwise, as apparent from the following discussions, it is appreciated that throughout the specification discussions utilizing terms such as "processing", "calculating", "computing", "obtaining", "utilizing", "adjusting", "determining", "generating", "setting", "configuring", "selecting", "measuring", "searching", "causing", "estimating", "displaying", "communicating", "receiving", "validating", "storing" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a Smartphone or other handheld device that includes or is associated with sensors capable of measuring a displacement of the Smartphone at least along a of a body part, etc.

Throughout the description of this document the term "body part" is used to relate to a predefined definition of a section of the human body that is shared between a measurement definition data, and an item specification.

Throughout the description and in the claims, the term "measurement definition data" is used. The term "measurement definition data" as used in the description and in the claims refers to a digital data definition, in any structured format (e.g., XML), which defines a measuring process of a respective section of the human body (for example, using a user's handheld device). The measurement definition data can be processed by a computerized device, e.g., a Smartphone or a handheld computerized device, to provide via a user interface unit instructions and/or guidance to user as to how to measure, for example using the handheld device, a respective body part.

Throughout the description and in the claims, the term "item specification" is used. The "item specification" as used in the description and in the claims refers to a digital data definition, in any structured format (e.g., XML), which provides data regarding an item, e.g., an item that can be purchased on-line or in a physical location, including at least a dimension (or dimensions) of at least one body part. By way of non-limiting example, the item specification can refer to a plurality of different item sizes, and for each size, the item specification can include a respective matching body part size. For example, the item specification of a certain t-shirt can include sizes ranging from extra-small (XS) to extra-large (XL), and for each of the different sizes of the t-shirt, the t-shirts' specification can include a different chest size, where the smallest chest size is associated with the XS size, and the chest size gradually increases with the sizes such that the chest size that is associated with the XL size is the largest.

By way of non-limiting example, the item specification can also include information with regard to the item's pattern, outline, etc., and the body part size of the item can vary for different types of such other specifications (and not only according to the item's size).

Throughout the description and in the claims, the term "handheld device" is used. The term "handheld device" as used in the description and in the claims, relates to a relatively small computerized device, which can be held by the hand by most adult people, such as a Smartphone or a smart camera, a tablet computer or similar devices, and which includes (or is associated with) in addition to a processor and a memory unit, a sensor that is adapted to measure physical displacement of the handheld device, and a user interface.

Thus, according to examples of the presently disclosed subject matter, given a measurement of a body part, the item specification of a given item can be evaluated to determine whether the item matches the measurement of the body part (or vice-versa), or which one of a plurality of sizes of the item match the body part measurement. Likewise, given an item specification, a measurement of body part can be evaluated to determine whether it matches the item, or which body part measurement matches a certain item's size.

It would be appreciated that in some examples of the presently disclosed subject matter, a 1:1 correlation ratio between a body part measurements and an item's specification may not be necessary, and a match could be found when the body part measurement is within a given distance or within a certain range from the size of the respective body part as set forth in or as determined based on the item's specification.

Furthermore, it would be appreciated that in further examples of the presently disclosed subject matter, various tolerances can be implemented as part of the measurement and/or matching operations, such that a matching can be found even when there isn't a full or complete matching between the body part measurement and the item specification.

Reference is now made to FIG. 1, which is a block diagram illustration of an apparatus for obtaining a measurement of a body part and a matching item, according to examples of the presently disclosed subject matter. According to examples of the presently disclosed subject matter, an apparatus for obtaining a measurement of a body part and a matching item 100 can include a processor 110, a memory unit 120, a configuration repository 130, a measurement engine 130, a sensor 150, an item search engine 160 and a display 170. According to examples of the presently disclosed subject matter the apparatus 100 can be a handheld device 25, such as smart phone, or the apparatus 100 can be implemented on a handheld device 25. In further examples of the presently disclosed subject matter, one or more of the above components of the apparatus 100 can be implemented in software.

According to further examples of the presently disclosed subject matter, one or both of the item search engine and the configuration repository can be implemented on a remote server 125 that is operatively connected to the handheld device 25, for example, through the Internet. As can be seen in FIG. 1, the processor 110 memory unit 120, a measurement engine 130, sensor 150 and display 170 implemented on the handheld device 25 can form a distributed apparatus 100 with the item search engine 142 and the configuration repository 152 on the remote server 125. Furthermore, according to yet further examples of the presently disclosed subject matter, the processing of the measurements made by the sensor can also be performed on a remote server, e.g., server 125, and the remote server 125 can also include a memory unit or any other suitable data retention/storage device for storing a measurement received from the handheld device 25.

In other words, according to one aspect of examples of the presently disclosed subject matter, there can be provided a handheld- device that implements a process within the handheld device for instructing a user how to measure and for measuring, using a displacement measuring sensor, a first body part of a user according to a definition of the first body part that is shared with an item specification, and further within the handheld device, searching for items whose item specification matches the first measurement, where the search can either be local, within the handheld device, or the search can be remote (e.g., a Internet search), whereby a search engine that is implemented within the handheld device is used to search one or more remote computers. According to another aspect, there is provided a system which includes a handheld device and one or more remote servers, where the handheld device is configured display instructions as to how to measure and for measuring, using a displacement measuring sensor, a first body part of a user according to a definition that is shared with an item specification. The display and measurement operations can be controlled by a body part measurement engine that is implemented within the handheld device, or the display and/or measurement operations which are carried out using resources of the handheld device (the display and the displacement measuring sensor) can be controlled remotely by a remote server, e.g., by a body part measurement engine that is implemented within the remote server(s). Further according to examples of the presently disclosed subject matter, the processing of the measurement of the first body part and the search for an item that matches the measurement can be implemented within the remote server(s). Still further according to examples of the presently disclosed subject matter, the search for items whose specification matches the measurement of the first body part can be implemented by the handheld device 25, or in other examples, the search can be carried out in the remote server 125, based on the measurement of the first body part that was received from the handheld device. In case search is carried out by the remote server, the search results can be communicated from the remote server 125 to the handheld device 125, wherein, for example, the results can be stored and/or displayed (or otherwise used).

The following description relates to both the centralized configuration and to each one of the distributed configurations, and those versed in the art can readily implement the examples of the subject matter disclosed herein to either configuration.

In further examples of the presently disclosed subject matter, the apparatus 100 can be operatively connected to item provider servers 50, the search engine can be configured to search for items' whose item specification matches the measurement of the first body part on the provider servers 50, as will be explained in further detail below.

The processor 110 and memory unit 120, in cooperation with the other components of the apparatus 100, can operable for initiating and/or executing the method of obtaining a measurement of a body part and a matching item, as will be described herein. The processor 110 and memory unit 120 can be any commercially available or yet to be devised processing and memory units, respectively.

Figure 2:
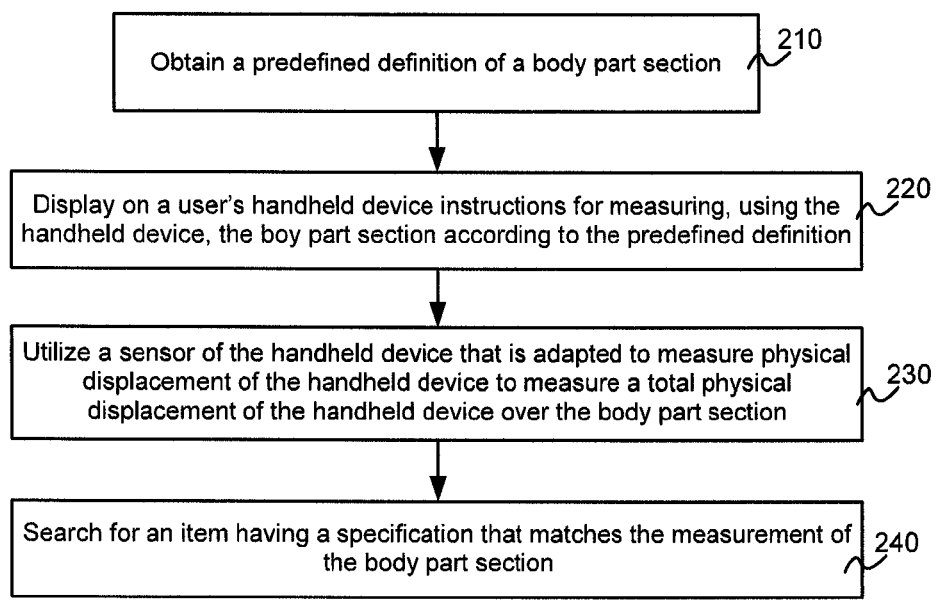
FIG. 2 is a flowchart illustration of a method of obtaining a measurement of a body part and a matching item, according to examples of the presently disclosed subject matter.

Reference is now additionally made to FIG. 2, which is a flowchart illustration of a method of obtaining a measurement of a body part and a matching item, according to examples of the presently disclosed subject matter. According to examples of the presently disclosed subject matter, initially, a predefined definition of a first body part can be obtained (block 210), for example, from the configuration repository 130. In some examples of the presently disclosed subject matter, the definition can include structured text (e.g. XML) or values referencing certain start/end/intermediate points on the human body which defined a certain body part. In further examples, the definition can include perspective images of certain body parts, which can assist in the measurement of the first body part. It would be appreciated that the definition of a body part can be provided in various other forms.

According to examples of the presently disclosed subject matter, a predefined definition of a body part can be provided, for example, in respect of each one of the following, or with respect to some part thereof: sleeve length, inseam length, arm circumference, chest circumference, neck circumference, waist circumference, etc, and the first body part can be any of the above, or any other body part, in this regard it would be appreciated that this list is non-exhaustive.

At block 220 instructions for measuring, using the handheld device, the first body part according to the predefined definition can be displayed on the user's handheld device 25. According to examples of the presently disclosed subject matter, the display unit 170 can be used for displaying the instructions for measuring. It would be appreciated that further examples of the presently disclosed subject matter are not limited to displaying the measuring instructions, and that the instructions for measuring, using the handheld device, the body part according to the predefined definition can be provided in other forms, including for example, using audio recording etc. In still further embodiments, the instructions can be interactive, and can be generated or selected from a pre-stored library in real-time according to the ongoing measurement by the user and/or in accordance with other factors which can have a bearing on the measurement.

According to examples of the presently disclosed subject matter, the sensor 150 of the handheld device 25 can be adapted to measure physical displacement of the handheld device 25. For example, the sensor 150 can be comprised of a gyroscope and accelerometer, and the gyroscope and accelerometer can be utilized to sense the movement and acceleration of the handheld device 25 when it is moved.

According to examples of the presently disclosed subject matter, at block 230, the sensor 150 of the handheld device 25 that is adapted to measure physical displacement of the handheld device is moved according to the instructions for measuring, using the handheld device, the first body part according to the predefined definition. The sensor's 150 readings can be processed by the measurement engine 130 to produce measurement of the first body part. The measurement engine 130 can be adapted to process the sensor's 150 output for the first body part, and to provide a resulting value which is based on the total measurement by the sensor 150 for the first body part.

According to examples of the presently disclosed subject matter, in case the measurement is defined by an item specification that is characterized by a plurality of body part measures, the handheld device 25 can be used to provide a corresponding set of measurements of a respective plurality of body parts. The measurement of the plurality of body part can be controlled by the measurement engine 130. For example, the measurement engine 130 can determine the order by which the body parts are measured and can be configured to associate each measurement with an indication of the body part to which it relates. In still further examples of the presently disclosed subject matter, the measurement engine 130 can be configured to compute a single measurement from the plurality of measurements, for example, based on a predefined model of the human body and some predefined criteria.

In a further example, the handheld device 25 can be used to provide measurements for only some of the plurality of body parts for which the item specification includes a measure. In such a case, the matching between the measurement and the item can be made based on the partial measurements taken by the handheld device. By way of example the measurement engine 130 can be configured to determine which measurements of which body part can or should be taken, and how. In a further example, some or all of the missing measurements can be obtained from other source, such as, from an input received from the user or from another source. In still a further example, the missing measurements can be synthetically produced (via some calculation, and not by measurement), including for example, by the handheld device 25. For the purpose of calculating the missing measurements, the handheld device can be configured to take into account the measurements of the body part(s) which were taken by the handheld device 25 and/or input(s) from external sources.

As mentioned above, according to examples of the presently disclosed subject matter, measurements can be obtained in respect of more than one body part section. Further by way of example, each time a different body part is selected, blocks 210-230 can be implemented for the selected body part. The measurement engine 130 can be adapted to process the sensor's 150 output for each one of the plurality of body parts, and can be capable of providing a resulting value which is based on the total measurement by the sensor 150 for a given body part.

At block 240, a search can be conducted for an item that has a specification that matches the measurement of the body part(s). It would be appreciated that since the body part is defined and measured according to a predefined definition of the human body, and this predefined definition is shared with the item specification, which relates to a respective measure, the item search engine 160 can search for an item which is characterized by a measure that matches the measured body part(s). It would be appreciated that here different items can have similar characteristics but can differ in size. For example, an item can be a certain garment in a specific size, and the same garment in a different size would be considered a different item.

Thus, by way of non-limiting example, if the measurement of the waist relates to the distance between pelvis bones (rather than to the circumference of the belly for example), the item specification has a measure which refers to the same body part, i.e., to the distance between pelvis bones (rather than to the circumference of the belly). However, in other examples, if the item specification has a measure which refers to the circumference of the belly, the definition of the belly circumference, when processed, for example by the measurement engine 130, can require the user to measure, using the handheld device, the distance between the user's pelvis bones, and the measurement engine 130 can be capable of processing the measurement of the distance between the user's pelvis bones to estimate the circumference of the user's belly, and the estimate measurement is then used in the search for an item having a specification that matches the estimated measurement.

According to examples of the presently disclosed subject matter, the item search engine 160 can further use personal data of the user to find matching items, such as age, build, color preferences, style preferences, etc. In some examples of the presently disclosed subject matter, the item search engine 160 can be adapted to adjust the measurements of a body part according to the personal data provided by the user, and accordingly the search for matching item and possibly also the results of the search can be modified.

According to examples of the presently disclosed subject matter, the search for an item that has a specification that matches the measurement of the body part(s) can return one or more results which can presented to the user on the display 170.

According to examples of the presently disclosed subject matter, the item search based on the first body part measurement can return a group of items which are selected in response to a search query that includes the measurements of the first body part. The items group can include items which match the measurement of the first body part. The results can be presented to the user and the handheld device 25 can include some interface (not shown) through which the user can select one or more of the results from the group. Selecting a result can allow a purchase of the selected item. For example, the display or the results can be associated with links (e.g., a URL), and upon selection of a certain result, the user can be redirected to a web-site were the user can discover more details about the item, and where the user can purchase the item on-line. It would be appreciated that the above is one possible example of the manner by which results can be presented to the user, and that according to examples of the presently disclosed subject matter, other digital presentation and transaction methods can be implemented by the handheld device 25.

Still further according to examples of the presently disclosed subject matter, the results of the item search based on the first body part measurement, can be provided as a code (or a set of one or more codes) representing a item whose specification matches at least the first body part measurement. The codes can be processed by the processor 110 for example, to allow presentation or use in any other way or means of the results by the user.

Still further according to examples of the presently disclosed subject matter, the results of the item search based on the first body part measurement can include providing data in respect of an item that matches the measurement of the first body part including one or more locations where the matching item can be obtained. In yet further examples of the presently disclosed subject matter, the handheld device 25 can include a positioning sensor (not shown), e.g., a GPS unit, and the positioning sensor can be capable of directing the user to the one or more locations where the item that matches the measurement of the first body part can be obtained.

According to examples of the presently disclosed subject matter, the measurement engine 130 can include a validation module that is adapted to validate the measurements of the body part, for example using statistical data that is associated with the body part. For example, the validation module can detect that the measurement of the first body part deviates significantly from statistical data, or other user data, such as a measurement of a second body part or other information regarding the user (e.g., the user's gender). Further according to examples of the presently disclosed subject matter, measurement engine 130 can be capable of testing the reliability of the measurement of the first body part using a predefined reliability criterion, which can test, for example, a relation between the measurement of the first body and some statistical data or a relation between the measurement of the first body and other user data.

Yet further by way of example, in case the measurement of the first body part is considered to be unreliable, the measurement engine 130 can be configured to invoke and control a process for measuring at least one more body part, and the additional measurement can be used to evaluate the reliability of the previous measurement(s). Still further by way of example, in case the measurement of the first body part is considered to be unreliable the measurement engine 130 can be configured to adjust the measurement of the first body part, using a measurement of a second body part of some other user data.

Further discussion of some examples of validation operations, possibly implemented by the measurement engine 130, is provided below.

According to examples of the presently disclosed subject matter, the item search engine 160 can be configured to communicate the measurement of the first body part to subscribed external servers, e.g. provider servers 50, to receive data from the subscribed external servers in respect of an item having a specification that matches the measurement of the first body part.

According to a further aspect of the presently disclosed subject matter, there is provided a method of obtaining measurements of a user. According to examples of the presently disclosed subject matter, the method of obtaining measurements of a user can include: utilizing a sensor of a handheld device that is adapted to measure physical displacement of the handheld device to measure a total physical displacement of the handheld device's movement over a first body part, giving rise to a first measurement; obtaining a second measurement of a second body part; obtaining a set of predefined sizes of an item, each one of the sizes is associated with a different size of at least the first body part; and adjusting the first measurement using the second measurement.

Figure 3:
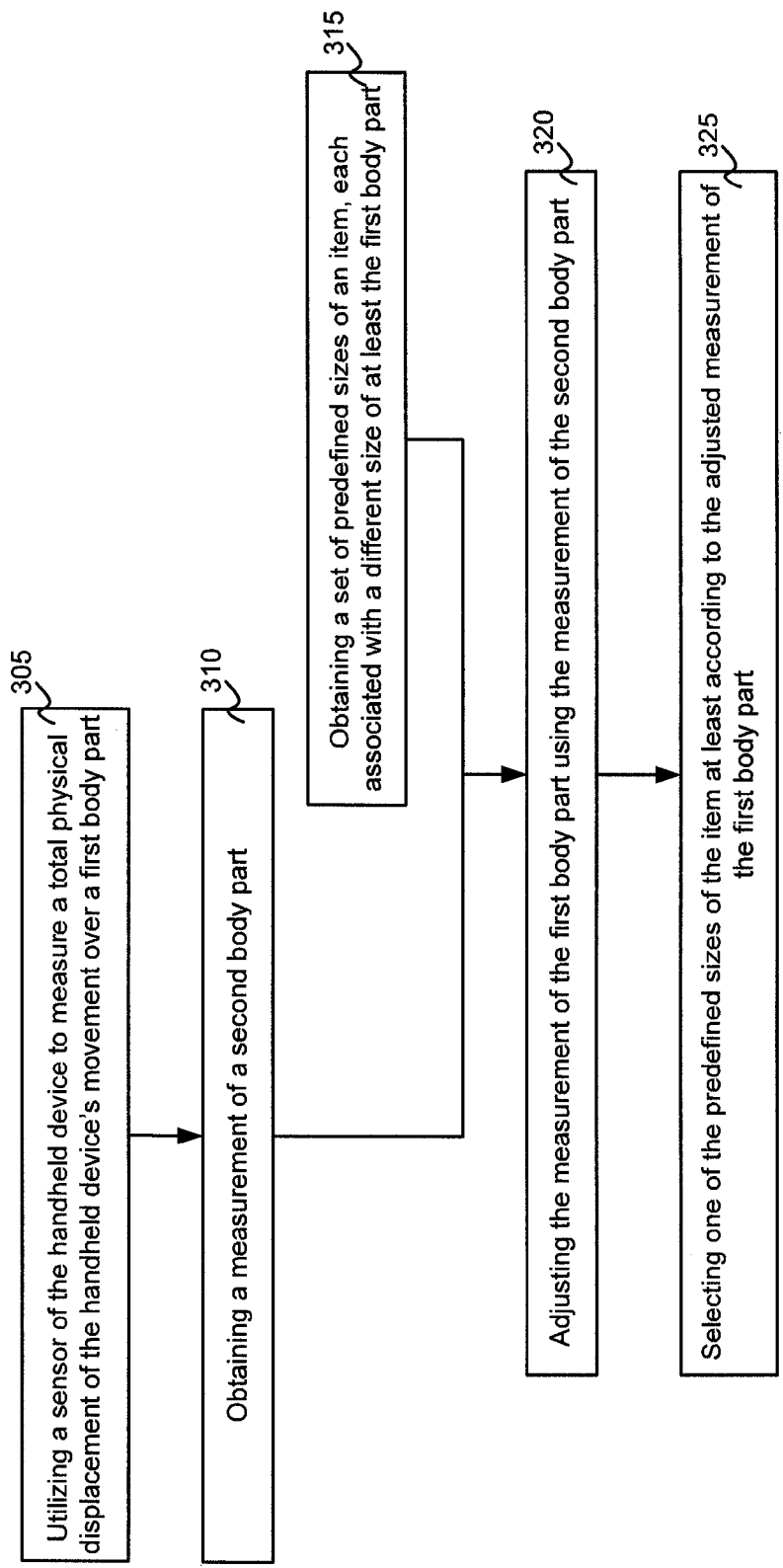
FIG. 3 is a flowchart diagram illustration of a method of obtaining measurements of a user, according to examples of the presently disclosed subject matter.

Reference is now made to FIG. 3, which is a flowchart diagram illustration of a method of obtaining measurements of a user, according to examples of the presently disclosed subject matter. By way of non-limiting example, the system 100 shown in FIG. 1, including the handheld device 25 can be used for carrying out the method of obtaining measurements of a user described herein, in particular the method described with reference to FIG. 3. It would be also appreciated, that any other suitable system or device can be used for implementing the method of obtaining measurements of a user. Such a device is also referred to herein as a device for obtaining measurements of a user.

In still further examples, the distributed system that is also shown in FIG. 1, including the handheld device 25 and the one or more remote servers 125, can be used cooperatively for carrying out the method of obtaining measurements of a user described herein, in particular the method described with reference to FIG. 3. In this implementation, one or more (including all) of the following operations can implemented within the remote server:
- controlling the instructing operation whereby a user is instructed how to measure, using a displacement measuring sensor, a first body part of a user according to a definition of the first body part that is shared with an item specification.
- controlling the measurement operation whereby a displacement measuring sensor is used to measure a first body part.
- the processing of the measurement of the first body and the adjusting of the measurement of the first body part using a measurement of a second body part.
- the searching for an item that matches the adjusted measurement of the first body part.

Reverting now to the description of FIG. 3, in block 305, a sensor of the handheld device can be utilized to measure a total physical displacement of the handheld device's movement over a first body part. The first body part can be set forth in a predefined definition of the first body part. The predefined definition of the first body part is shared with an item's specification, where the item specification includes a set of predefined sizes of the item, and each one of the item's sizes is associated with a different size of at least the first body part. By way of example, the sensor 160 of handheld device 150 can be used for measuring the first body part.

In this aspect of the presently disclosed subject matter, the term "item" is used such that a single item can have a plurality of versions where the versions differ from one another by size (e.g., XS, S, M, etc.) and each of the item's versions is associated at least with a different size of the first body part, according to the predefined definition of the first body part.

The predefined definition of the first body part can be stored in the handheld device, or can be accessed via a network connection. For example, from the configuration repository 150. In some examples of the presently disclosed subject matter, the definition can include structured text (e.g. XML) or values referencing certain start/end/intermediate points on the human body which defined a certain body part. In further examples, the definition can include perspective images of certain body parts, which can assist in the measurement of the first body part. It would be appreciated that the definition of a body part can be provided in various other forms.

Instructions for measuring, using the handheld device, the first body part according to the predefined definition can be displayed on the user's handheld device 25. According to examples of the presently disclosed subject matter, the display unit 170 can be used for displaying the instructions for measuring the first body part. It would be appreciated that further examples of the presently disclosed subject matter are not limited to displaying the measuring instructions, and that the instructions for measuring, using the handheld device, the first body part according to the predefined definition can be provided in other forms.

In still further embodiments, the instructions can be interactive, and can be generated or selected from a pre-stored library in real-time according to the ongoing measurement by the user and/or in accordance with other factors which can have a bearing on the measurement.

Examples of the structure, configuration and operation of each of the measurement engine 130 and the configurations repository 150 were described above with reference to FIG. 1, and the teachings provided above are applicable here as well, and can be implemented at least for measuring the first body part.

According to examples of the presently disclosed subject matter, at block 310 a measurement of a second body part can be obtained. In a non-limiting example, the measurement of the second body part can be obtained using the same sensor 160 (by measuring physical displacement of the handheld device's movement over the second body part). In further examples of the presently disclosed subject matter, the measurement of the second body part can be obtained using any other suitable sensor, onboard the handheld device or external, together with any necessary processing.

For example, the measurement of the second body part can be obtained from a 2D image of the user. Further by way of example, the image frame can include some object which has known dimensions (size) and which can be relatively readily detected via image processing. For example, it is known in the art to use a Compact Disk (CD) held by a subject of the image (a person holding the CD) to get a perspective, and thus, via image processing the size of various body parts can be extracted.

In still further examples of the presently disclosed subject matter, the measurement of the second body part can be provided as input, either as a manual input from the user (e.g., using an interface, such as a keyboard or a touch screen), or the input can be obtained from a digital source, such as a remote server, a database, etc.

According to examples of the presently disclosed subject matter, the measurement of the first body part can be adjusted using the measurement of the second body part (block 320). By way of example, the adjustment of the measurement of the first body part can be carried out by the processor 110, according to instructions stored in the configuration repository 150. There will now be provided a number of examples of operations that can be carried out as part of adjusting the measurement of the first body part using the measurement of the second body part. It would be appreciated that many other operations can be used.

According to examples of the presently disclosed subject matter, the calculation of the adjustment of the measurement of the first body part can include: calculating an estimate of a size of a second body part, obtaining a measurement of the second body part and calculating a relation between the estimate for the size of the second body part and the measurement of the second body part. The adjustment of the measurement of-the first body part can be determined according to the relation between the estimate for the size of the second body part and the measurement of the second body part.

It would be appreciated that according to examples of the presently disclosed subject matter, the measurement of the second body part can be a result of several (e.g., two, three, . . . , n) measurements.

According to examples of the presently disclosed subject matter, the calculation of the adjustment of the measurement first body part can include: calculating based on the measurement of the first body part a first estimate for the size of a second body part and computing a certainty parameter based on a relation between the first estimate and the measurement of the second body part. Further by way of example, if the certainty parameter fails to meet a certainty criterion, calculating based on the measurement of the first and/or the second body part a second estimate for the size of a third body part, obtaining a third measurement of a third body part. The process can go on until the certainty parameter meets the certainty criterion. Still further by way of example, when the certainty parameter meets the certainty criterion, least the measurement of the first body part can be adjusted based on one other measurement (or based on a plurality of such other measurements).

According to examples of the presently disclosed subject matter, in addition to the adjusted measurement of the first body part, a set of predefined sizes of an item can be obtained, where each size is associated with a different size of at least the first body part (block 315). According to examples of the presently disclosed subject matter, the sizes of the item and the association between each one of the item's size and a respective size of at least the first body part can be included in the item's specification. In yet further examples of the presently disclosed subject matter, the first body part definition that is used for measuring (e.g., instructing the user how to measure) the first body part can match the definition that was used in the item specification. Thus, there is a correlation between the first body part measurements taken with the handheld device and the sizes in the item's specification. It is therefore possible to correlate a given measurement of the first body part with a matching size of an item, or with an item that has a matching size. Various matching methods, techniques and algorithms can be used for searching for a matching first body part measurement and item size.

At block 325, one of the predefined sizes of the item can be selected at least according to the adjusted measurement of the first body part. It would be appreciated that according to examples of the presently disclosed subject matter, the measurement of the first body part prior to adjustment is associated with a first predefined size of the item, and the adjusted measurement of the first body part can be associated with a second predefined size of the item.

There is now provided a description of a non-limiting example of a scenario in which some examples of the presently disclosed subject matter can be involved. By way of example, the first body part can be a waist. The search for a matching size can be carried out with respect to a certain pair of trousers. By way of example, prior to the adjustment, the size of a person's waist can be associated with a size M (medium) of the trousers (according to the trousers item specification), but the measurement of the person's waist size can be adjusted based on one or more further measurements of other body parts of the same person (say, the inseam length) and according to the adjusted waist size, it may be determined that size S (small) can be more appropriate for that person.

According to a further aspect of the presently disclosed subject matter, there is provided a method of obtaining measurements of a user. According to examples of the presently disclosed subject matter, the method of obtaining measurements of a user can include: utilizing a sensor of a handheld device that is adapted to measure physical displacement of the handheld device to measure a total physical displacement of the handheld device's movement over a first body part, giving rise to a first measurement; obtaining a second measurement of a second body part; obtaining a set of predefined sizes of an item, each one of the sizes is associated with a different size of at least the second body part; and adjusting the second measurement using the first measurement.

Figure 4:
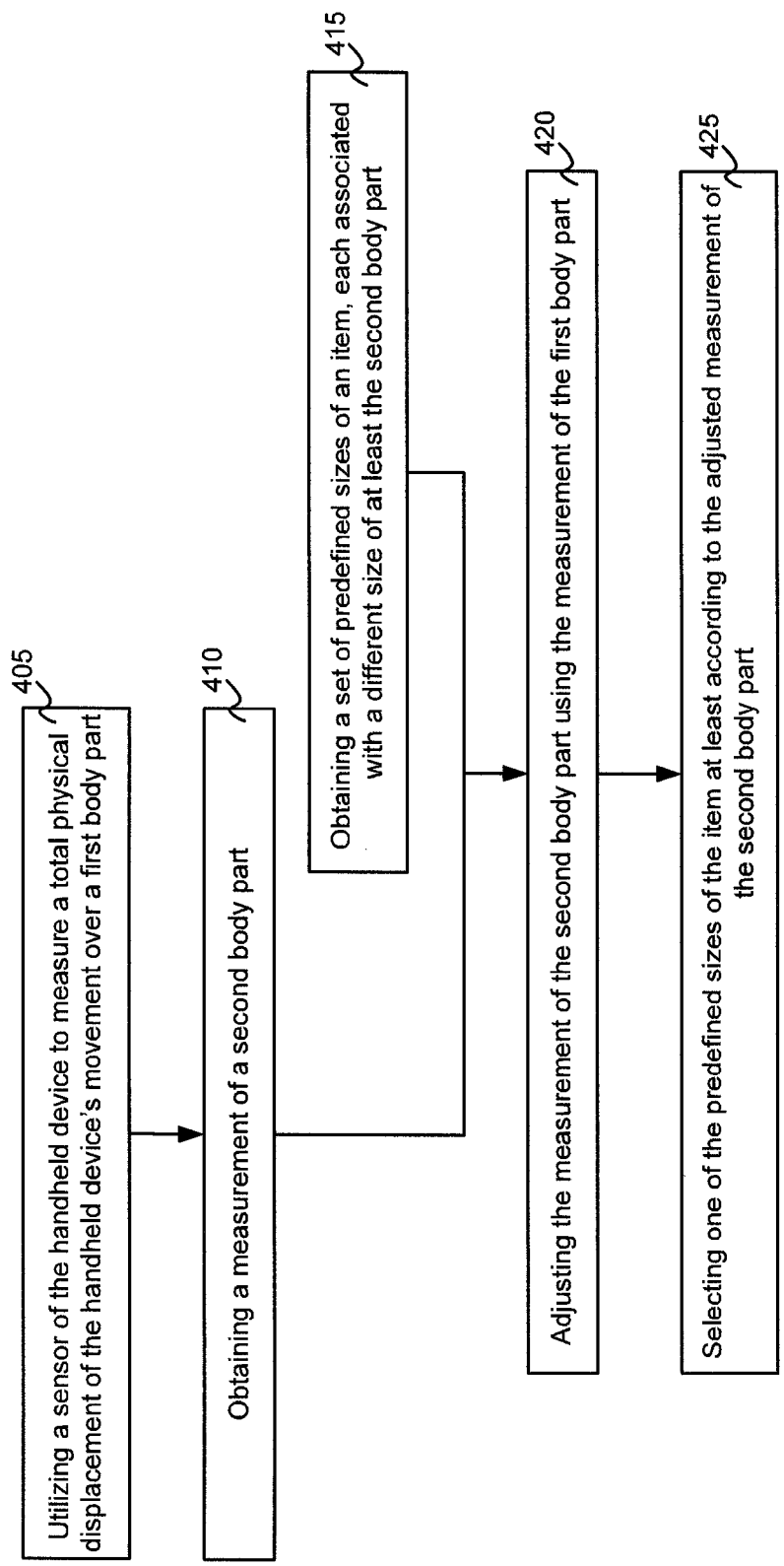
FIG. 4 is a flowchart diagram illustration of a method of obtaining measurements of a user, according to examples of the presently disclosed subject matter.

Reference is now made to FIG. 4, which is a flowchart diagram illustration of a method of obtaining measurements of a user, according to examples of the presently disclosed subject matter. By way of non-limiting example, the system 100 shown in FIG. 1, including the handheld device 25 can be used for carrying out the method of obtaining measurements of a user described herein, in particular the method described with reference to FIG. 4. It would be also appreciated, that any other suitable system or device can be used for implementing the method of obtaining measurements of a user. Such a device is also referred to herein as a device for obtaining measurements of a user.

In still further examples, the distributed system that is also shown in FIG. 1, including the handheld device 25 and the one or more remote servers 125, can be used cooperatively for carrying out the method of obtaining measurements of a user described herein, in particular the method described with reference to FIG. 4. In this implementation, one or more (including all) of the following operations can implemented within the remote server:

controlling the instructing operation whereby a user is instructed how to measure, using a displacement measuring sensor, a first body part of a user according to a definition of the first body part that is shared with an item specification.

controlling the measurement operation whereby a displacement measuring sensor is used to measure a first body part.

the processing of the measurement of the second body part and the adjusting of the measurement of the second body part using the measurement of the first body part.

the searching for an item that matches the adjusted measurement of the second body part.

Reverting now to the description of FIG. 4, in block 405, a sensor of the handheld device can be utilized to measure a total physical displacement of the handheld device's movement over a first body part. The first body part can be set forth in a predefined definition of the first body part. The predefined definition of the first body part is shared with an item's specification, where the item specification includes a set of predefined sizes of the item, and each one of the item's sizes is associated with a different size of at least the first body part. By way of example, the sensor 160 of handheld device 150 can be used for measuring the first body part.

In this aspect of the presently disclosed subject matter, the term "item" is used such that a single item can have a plurality of versions where the versions differ from one another by size (e.g., XS, S, M, etc.) and each of the item's versions is associated at least with a different size of the second body part, according to the predefined definition of the second body part.

The predefined definition of the first body part can be stored in the handheld device, or can be accessed via a network connection. For example, from the configuration repository 150. In some examples of the presently disclosed subject matter, the definition can include structured text (e.g. XML) or values referencing certain start/end/intermediate points on the human body which defined a certain body part. In further examples, the definition can include perspective images of certain body parts, which can assist in the measurement of the first body part. It would be appreciated that the definition of a body part can be provided in various other forms.

Instructions for measuring, using the handheld device, the first body part according to the predefined definition can be displayed on the user's handheld device 25. According to examples of the presently disclosed subject matter, the display unit 170 can be used for displaying the instructions for measuring. It would be appreciated that further examples of the presently disclosed subject matter are not limited to displaying the measuring instructions, and that the instructions for measuring, using the handheld device, the body part according to the predefined definition can be provided in other forms.

In still further embodiments, the instructions can be interactive, and can be generated or selected from a pre-stored library in real-time according to the ongoing measurement by the user and/or in accordance with other factors which can have a bearing on the measurement.

Examples of the structure, configuration and operation of each of the measurement engine 130 and the configurations repository 150 were described above with reference to FIG. 1, and the teachings provided above are applicable here as well, and can be implemented at least for measuring the first body part.

According to examples of the presently disclosed subject matter, at block 310 a measurement of a second body part can be obtained. In a non-limiting example, the measurement of the second body part can be obtained using the same sensor 160 (by measuring physical displacement of the handheld device's movement over the second body part). In further examples of the presently disclosed subject matter, the measurement of the second body part can be obtained using any other suitable sensor, onboard the handheld device or external, together with any necessary processing.

For example, the measurement of the second body part can be obtained from a 2D image of the user. Further by way of example, the image frame can include some object which has known dimensions (size) and which can be relatively readily detected via image processing. For example, it is known in the art to use a Compact Disk (CD) held by a subject of the image (a person holding the CD) to get a perspective, and thus, via image processing the size of various body parts can be extracted.

In still further examples of the presently disclosed subject matter, the measurement of the second body part can be provided as input, either as a manual input from the user (e.g., using an interface, such as a keyboard or a touch screen), or the input can be obtained from a digital source, such as a remote server, a database, etc.

According to examples of the presently disclosed subject matter, the measurement of the second body part can be adjusted using the measurement of the first body part (block 320). By way of example, the adjustment of the measurement of the second body part can be carried out by the processor 110, according to instructions stored in the configuration repository 150. There will now be provided a number of examples of operations that can be carried out as part of adjusting the measurement of the second body part using the measurement of the first body part. It would be appreciated that many other operations can be used.

According to examples of the presently disclosed subject matter, the calculation of the adjustment of the measurement of the second body part can include: calculating an estimate of a size of a first body part based on the measurement of the second body part, obtaining a measurement of the first body part and calculating a relation between the estimate for the size of the first body part and the measurement of the first body part. The adjustment of the measurement of the second body part can be determined according to the relation between the estimate for the size of the first body part and the actual measurement of the first body part.

It would be appreciated that according to examples of the presently disclosed subject matter, the measurement of the second body part can be a result of several (e.g., two, three, . . . , n) other measurements, or can include several measurements, each of a different body part, and hereby collectively referred to as the measurement of the second body part.

According to examples of the presently disclosed subject matter, the calculation of the adjustment of the measurement of the second body part can include: computing a certainty parameter based on a relation between an estimate for the size of the first body part and the actual measurement of the first body part. Further by way of example, if the certainty parameter fails to meet a certainty criterion, calculating based on the measurement of the first and/or the second body part a second estimate for the size of a third body part, obtaining a third measurement of a third body part, and testing the measurement of the third body part using the estimate for the size of the third body part and the certainty criterion. The process can go on until the certainty parameter meets the certainty criterion. Still further by way of example, when the certainty parameter meets the certainty criterion, least the second measurement can be adjusted based on one other measurement (or based on a plurality of such other measurements).

According to examples of the presently disclosed subject matter, in addition to the adjusted measurement of the second body part, a set of predefined sizes of an item can be obtained, where each size is associated with a different size of at least of the second body part (block 315). According to examples of the presently disclosed subject matter, the sizes of the item and the association between each one of the item's size and a respective size of at least the second body part can be included in the item's specification. Various matching methods, techniques and algorithms can be used for searching for a matching second body part measurement and item size.

At block 325, one of the predefined sizes of the item can be selected at least according to the adjusted second measurement. It would be appreciated that according to examples of the presently disclosed subject matter, the measurement of the second body part prior to adjustment is associated with a first predefined size of the item, and the adjusted measurement of the second body part can be associated with a second predefined size of the item.

There is now provided a description of a non-limiting example of a scenario in which some examples of the presently disclosed subject matter can be involved. By way of example, the second body part can be a waist. The search for a matching size can be carried out with respect to a certain pair of trousers. By way of example, prior to the adjustment, the size of a person's waist can be associated with a size M (medium) of the trousers (according to the trousers item specification), but the measurement of the person's waist size can be adjusted based on one or more further measurements of other body parts of the same person (say, the inseam length) and according to the adjusted waist size, it may be determined that size S (small) can be more appropriate for that person.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of obtaining a user's measurement for matching an item, comprising:
   obtaining a predefined definition of a first body part;
   displaying on a display of the user's handheld device instructions for measuring, using the handheld device, the first body part according to the predefined definition;
   utilizing a sensor of the handheld device that is adapted sense data including the movement or acceleration of the handheld device when it is moved over the first body part and determine physical displacement of the handheld device's movement over the first body part based on the data, giving rise to a first measurement; and
   searching for an item having a specification that matches the first measurement.

2. The method according to claim 1, comprising:
   obtaining a predefined definition of a second body part;
   repeating said displaying and utilizing for the second body part, giving rise to a second measurement, and wherein said searching includes searching for an item having a specification that matches the first and the second measurements.

3. The method according to claim 1, further comprising obtaining personal data of the user, and wherein said searching comprises searching for an item having a specification that matches the first measurement and the user's personal data.

4. The method according to claim 3, wherein the personal data of the user includes one or more of the following: waist diameter, arm length, leg length, chest diameter, hip diameter, regular inseam, long inseam, short inseam, neck diameter.

5. The method according to claim 1, wherein the sensor is selected from a group consisting of: a gyroscope, an accelerometer, proximity sensor, compass, GPS sensor.

6. The method according to claim 1, further comprising: validating the first measurement using statistical data that is associated with the first body part.

7. The method according to claim 1, wherein said searching comprises communicating the first measurement and an indication regarding the body part to which it relates to one or more subscribers, and in response to said communicating receiving data in respect of an item having a specification that matches the first measurement.

8. The method according to claim 1, wherein in response to said searching, selecting a group of items which matches said first measurement, and allowing the user to select an item from the group of items.

9. The method according to claim 1, wherein in response to said searching, providing a code of an item that matches the first measurement.

10. The method according to claim 1, wherein in response to said searching, providing data in respect of an item that matches the first measurement including one or more locations where the matching item can be obtained.

11. The method according to claim 10, further comprising utilizing a positioning sensor in the handheld device, to direct the user to the one or more locations where the item that matches the first measurement can be obtained.

12. The method according to claim 1, comprising:
   obtaining a second measurement of a second body part;
   obtaining a set of predefined sizes of an item, each one of the sizes is associated with a different size of at least the first body part;
   adjusting the first measurement using the second measurement to determine an adjusted first measurement value;
   and wherein said searching is performed to match the adjusted first measurement value.

13. The method according to claim 12, further comprising calculating, based on the first measurement, an estimate for the size of the second body part, and wherein said adjusting is based on a relation between the estimate for the size of the second body part and the second measurement.

14. The method according to claim 12, wherein the second measurement is comprised of a plurality of measurements.

15. The method according to claim 1, wherein said handheld device is a smart-phone.

16. The method according to claim 1, further comprising:
   utilizing the sensor of the handheld device to sense additional data including the movement or acceleration of the handheld device when it is moved over a second body part and determine physical displacement of the handheld device's movement over the second body part based on the additional data, giving rise to a second measurement;
   adjusting the first measurement based on the second measurement to determine an adjusted first measurement value; and
   wherein said searching is performed to search for an item having a specification that matches the adjusted first measurement value.

17. The method according to claim 16, further comprising:
   obtaining a predefined definition of the second body part;
   displaying on a user's handheld device instructions for measuring, using the handheld device, the second body part according to the predefined definition.

18. A handheld device for obtaining a user's measurement for matching an item, comprising:
   a display configured to display instructions for measuring;
   a sensor adapted to sense data including the movement or acceleration of the handheld device when it is moved over a first body part;
   a body part definition repository including a predefined definition of at least the first body part;
   a measurement repository that is adapted to store a measurement of at least the first body part;
   a body part measurement engine that is adapted to implement a body measurement routine including:
      displaying on the display instructions for measuring the first body part according to a respective definition of the first body part;
      determining, based on data sensed by the sensor, physical displacement of the handheld device over first the body part, giving rise to a first measurement; and
   an item search engine adapted to search for an item having a specification that matches the first measurement.

19. A system for obtaining a user's measurement for matching an item, comprising:
   a handheld device according to claim 18.

20. A computer program product comprising a computer useable medium having computer readable program code embodied therein for obtaining a user's measurement for matching an item, the computer program product comprising:
   computer readable program code for causing the computer to obtain a predefined definition of a first body part;

computer readable program code for causing the computer to display on a display of the user's handheld device instructions for measuring, using the handheld device, the first body part according to the predefined definition;

computer readable program code for causing the computer to utilize a sensor of the handheld device that is adapted to sense data including the movement or acceleration of the handheld device when it is moved over the first body part and determine physical displacement of the handheld device's movement over the first body part based on the data, giving rise to a first measurement; and computer readable program code for causing the computer to search for an item having a specification that matches the first measurement.

\* \* \* \* \*

UNITED STATES PATENT AND TRADEMARK OFFICE
CERTIFICATE OF CORRECTION

PATENT NO. : 9,799,068 B2
APPLICATION NO. : 14/373058
DATED : October 24, 2017
INVENTOR(S) : Shoshana Zigdon It is certified that error appears in the above-identified patent and that said Letters Patent is hereby corrected as shown below:

In the Claims

Column 21, Line 63 Claim 12 should be corrected to state the following:

12. The method according to claim 1, comprising:
obtaining a second measurement of a second body part;
adjusting the first measurement using the second measurement to determine an adjusted first measurement value;
and wherein said searching is performed to match the adjusted first measurement value.

Signed and Sealed this
Nineteenth Day of June, 2018

Andrei Iancu
*Director of the United States Patent and Trademark Office*